United States Patent Office 2,832,791
Patented Apr. 29, 1958

2,832,791

THIOSEMICARBAZONES OF THIENYLALDE-HYDES AND THIENYLKETONES

John V. Scudi, Springfield, N. J., and Floyd E. Anderson, Yonkers, N. Y., assignors, by mesne assignments, to Warner-Lambert Pharmaceutical Company, Morris Plains, N. J., a corporation of Delaware No Drawing. Application December 15, 1955
Serial No. 553,187

1 Claim. (Cl. 260—329)

This invention relates to thiosemicarbazones and relates more particularly to the thiosemicarbazone of 2,5-dimethyl-3-acetyl-thiophene having the formula

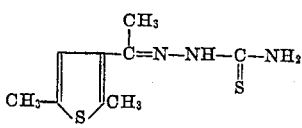

An object of this invention is the preparation of a thiosemicarbazone of a thienylketone having valuable bacteriostatic properties.

Another object of this invention is the preparation of the thiosemicarbazone of 2,5-dimethyl-3-acetylthiophene.

Other objects of this invention will appear from the following detailed description.

The novel compound of our invention has been found to have valuable bacteriostatic properties and is especially active against the *Streptococcus hemolyticus* organism, and the degree of activity exhibited is appreciably greater than that of compounds of analogous structure.

The thiosemicarbazone compound described is prepared by reacting thiosemicarbazide with 2,5-dimethyl-3-acetyl-thiophene in a suitable solvent such as ethanol, methanol or 1,4-dioxane, or mixtures of these solvents. The reaction to form the thiosemicarbazone is preferably carried out at reflux temperature for from 2 to 20 hours and the thiosemicarbazone formed is separated and purified as described below.

In order further to illustrate our invention but without being limited thereto, the following example is given:

Example 21 grams of thiosemicarbazide and 36.6 grams of 2,5-dimethyl-3-acetylthiophene were placed in a flask containing 150 ml. of ethanol and 125 ml. of distilled water and refluxed on a steam bath for a period of 12 hours. After being cooled, the precipitate was recrystallized from dilute 50% ethanol. The product, 2,5-dimethyl-3-acetylthiophenethiosemicarbazone, melts at 157° C. In a sulfur analysis there was found S=27.9%, theory 28.2%.

This thiosemicarbazone is a white crystalline substance. It is slightly soluble in water and more readily soluble in alcohols, such as methyl and ethyl alcohols. It is very soluble in glycerine and glycols, such as ethylene and propylene glycols, insoluble in benzene, chloroform, ether, and ligroin, but somewhat soluble in dioxane and slightly soluble in vegetable oils.

The solubility of this thiosemicarbazone in dilute acids and alkalis indicates that it is amphoteric, forming soluble salts with acids and with alkali metals.

The compound disclosed herein also exhibits bacteriostatic action against mycobacterium tuberculosis.

This application is a continuation-in-part of application S. No. 173,682, filed July 13, 1950, now abandoned.

It is understood that the foregoing detailed description is given merely by way of illustration and that many variations may be made therein without departing from the spirit of our invention.

Having described our invention, what we desire to secure by Letters Patent is:

What we claim is:

As a new product, 2,5-dimethyl-3-acetylthiophenethiosemicarbazone.

References Cited in the file of this patent

UNITED STATES PATENTS

| 2,723,270 | Scudi | Nov. 8, 1955 |
| 2,746,972 | Clemence | May 22, 1956 |
| 2,775,593 | Behnisch | Dec. 25, 1956 |

OTHER REFERENCES

Steinkopf: Annalen, vol. 424; pages 1–23 (1921).
Duca: Antibiotics and Chemotherapy, vol. 2, pages 16–20 (C. A. 46:6746h).